Jan. 23, 1962     C. DEJ. HERCULES     3,017,702
TIRE TREAD SAFETY GAUGE
Filed Dec. 11, 1959

INVENTOR.
CHRISTOPHER D. HERCULES
BY
*Walter S. Pawl.*
ATTORNEY

United States Patent Office 3,017,702
Patented Jan. 23, 1962

3,017,702
TIRE TREAD SAFETY GAUGE
Christopher De J. Hercules, 4640 Q St. NW.,
Washington, D.C.
Filed Dec. 11, 1959, Ser. No. 858,960
5 Claims. (Cl. 33—172)

This invention relates to tire tread measuring equipment for use by tire repair and service stations to assist them in accurately determining the safety-factor and useful mileage that is left in tires of various types.

The object is to provide a portable tread safety gauge for use on dismounted tires, having different safety-factor scales for several types of tires.

A further object is to make a light frame structure having upright supports, for straddling a tire casing section placed on a flat plate, and having a vertical probe member for sensing the thickness of the tread by dropping it inside the casing, an indicator lever and cooperating safety-factor scales mounted on said frame structure, said probe being pivotally connected to said lever near its fulcrum to provide suitably large indicator scales.

A further object is to construct a tire tread safety gauge having a frame of substantially inverted U-shape with a horizontally extending indicator lever pivoted on one leg of the frame for cooperation with an indicator scale on the other leg, and a vertically extending probe pivotally connected to said lever between said legs for dropping into the tire casing when the frame is straddled over the tire casing section the tread of which is resting on a flat plate.

Figures 1, 2:
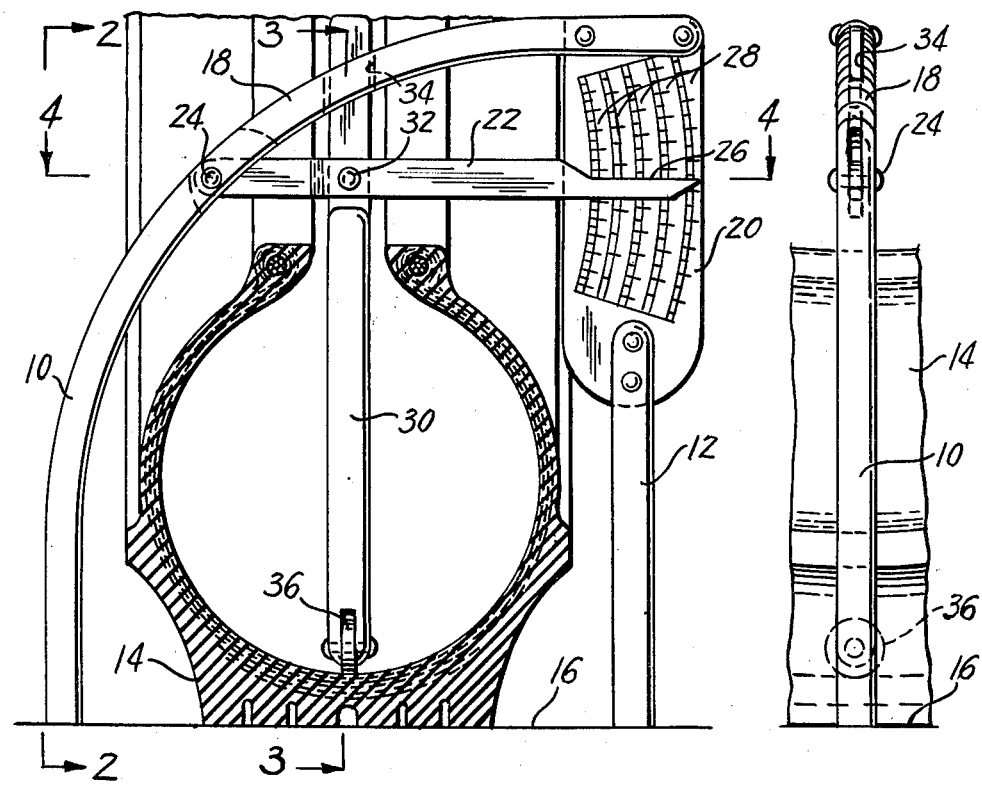
Figures 3, 4:
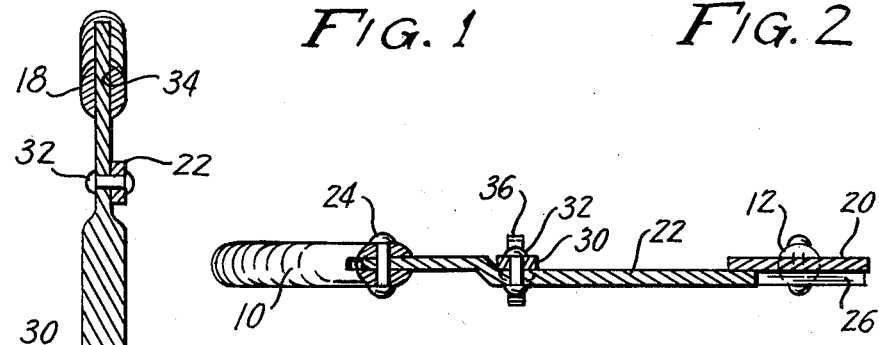

Other and more specific objects will become apparent in the following detailed description of one preferred form of the present invention, as illustrated in the accompanying drawing, wherein:

FIG. 1 is an elevational view of the tire tread gauge in use, showing a cross-section of the tire on which it is used, FIG. 2 is a side view in elevation taken in the direction indicated by the arrows of line 2—2 in FIG. 1, FIG. 3 is a detail sectional view taken on the line 3—3 of FIG. 1, and FIG. 4 is a detail sectional view taken on the line 4—4 of FIG. 1.

The thickness of the tire tread is an important clue to the safety-factor and the approximate mileage that may be expected from a tire of any specific type. Prior methods of determining this thickness accurately required an elaborate set-up of precisely measured frame-work and minute scale reading by an engineer skilled in geometrical measurements. The thickness would then have to be translated into the safety-factor in accordance with manufacturers' specification standards for the particular tire involved. As a result, in practice, a tire dealer usually resorted to guesswork in advising his client on the condition of his tire, by merely observing the apparent wear and flexibility of the tire tread, and basing his conclusions on the thickness he guessed the tread might be.

The present gauge may be used on any flat plate on which the tire casing is placed with its tread resting on the plate, by straddling a section of the tire casing with the two legs of the gauge frame resting on the plate at opposite sides of the tire casing, and allowing the probe rod to drop inside of the casing to rest on the inner surface of the casing substantially over the mid portion of the tread which is in contact with the plate. The indicator may then be read to show the safety-factor of the tire, on the proper scale corresponding to the type of tire being measured. In other words, the tire safety is gauged by measuring the remaining tread thickness.

Referring to the drawing, this gauge comprises an inverted U-shaped frame having legs 10 and 12 for straddling a section of a tire casing 14 which has its tread resting on a flat plate 16. Leg 10 may be substantially arcuately extended into the base portion 18 of the U-shape which is fixed to the top of the indicator scale plate 20, the lower end of which may be fixed to the top of leg 12, completing the frame.

Indicator lever 22 is pivotally connected to leg 10 at 24 and extends across the U-shape to the scale plate where a radial straight-edge 26 along its end portion swings over a plurality of indicator scales 28 for use in connection with different types of tires.

A probe rod 30 is pivotally hung on lever 22 at 32 for dropping inside the tire casing to rest on the inner surface 32 of the casing substantially over the middle of the tread surface resting on the plate 16. The upper end of rod 30 may be guided by a vertical slot 34 in the base portion of the U-shaped frame. The probe end of the rod 30 is provided with a roller 36 to facilitate movement of the gauge circumferentially of the tire casing, when shifting to new points of gauging the tire tread around the casing. Thus any unevenness in wear around the circumference of the tread may also be quickly detected and accurately determined.

Many modifications in form and details may obviously be made without departing from the spirit and scope of the present invention, as defined in the appended claims.

What is claimed is:

1. A tire tread safety gauge comprising a U-shaped frame having an indicator scale plate forming the base portion of one of the legs of the U-shaped frame, an indicator lever pivotally supported at one end on the other leg and having its other end sweeping over said scale-plate, and a probe rod hinged to said indicator lever and adapted for insertion inside a tire casing to sense the thickness of the tire tread of a casing resting on a flat surface when the gauge frame is held upright with its legs straddling said casing and resting on said surface.

2. A tire tread safety gauge as defined in claim 1, said scale plate having at least one arcuate scale, and said indicator lever end sweeping over said scale plate having a straight edge for indicating the reading on said arcuate scale corresponding to the thickness of the tire tread.

3. A tire tread safety gauge as defined in claim 2, said scale plate having a plurality of scales adapted to indicate values corresponding to different types of tires.

4. A tire tread safety gauge as defined in claim 1, said probe rod having a roller at its probe end to facilitate shifting the point of measurement circumferentially of the tire casing.

5. A tire tread safety gauge as defined in claim 4, a guide slot in the base portion of said U-shaped frame for the other end of said probe rod.

References Cited in the file of this patent

UNITED STATES PATENTS

| | | |
|---|---|---|
| 407,903 | Schlatter | July 30, 1889 |
| 469,680 | Clark | Mar. 1, 1892 |
| 2,224,728 | Gulliksen | Dec. 10, 1940 |
| 2,383,742 | Russell | Aug. 28, 1945 |

FOREIGN PATENTS

| | | |
|---|---|---|
| 1,028,544 | France | Feb. 25, 1953 |